United States Patent [19]
Ross
[11] 3,720,925
[45] March 13, 1973

[54] MEMORY SYSTEM USING VARIABLE THRESHOLD TRANSISTORS

[75] Inventor: Edward Charles Ross, Hightstown, N.J.
[73] Assignee: RCA Corporation, Somerville, N.J.
[22] Filed: Oct. 19, 1970
[21] Appl. No.: 81,713

[52] U.S. Cl. ...........340/173 R, 307/238, 340/166 R, 340/173 PP
[51] Int. Cl. ...........................G11c 7/00, G11c 11/40
[58] Field of Search...340/173 SP, 166 R, 173 R, 173 PP;307/238

[56] References Cited

UNITED STATES PATENTS

| | | | |
|---|---|---|---|
| 3,646,527 | 2/1972 | Wada | 340/173 R |
| 3,649,848 | 3/1972 | Ross | 340/173 R |
| 3,508,211 | 4/1970 | Wegener | 340/173 |
| 3,579,204 | 5/1971 | Lincoln | 340/173 |
| 3,529,299 | 9/1970 | Chung | 340/173 SP |
| 3,582,908 | 6/1971 | Koo | 340/173 SP |

FOREIGN PATENTS OR APPLICATIONS

| | | | |
|---|---|---|---|
| 1,131,210 | 10/1968 | Great Britain | 340/173 SP |

OTHER PUBLICATIONS

Kirk, MNOS Electronically Alterable Read-Only Stores, 9/70, IBM Technical Disclosure Bulletin, Vol. 13 No. 4, pp. 969–970
Bentchkowsky, An Integrated Metal-Nitride-Oxide-Silicon (MNOS) Memory, Proceedings of the IEEE, 6/69, pp. 1190–1192
Gurski, Field Effect Transistor Read-Only Storage Unit, IBM Technical Disclosure Bulletin, Vol. 7 No. 11, 4/65, pp. 1107–1108
Canard, Voltage Checking Device, IBM Technical Disclosure Bulletin, Vol. 8 No. 5, 10/65, pp. 806–807

*Primary Examiner*—Bernard Konick
*Assistant Examiner*—Stuart Hecker
*Attorney*—H. Christoffersen

[57] ABSTRACT

A word-organized memory array employing at each storage location only a single metal-insulator-semiconductor device. Information is written into selected devices by causing them to assume either a high or a low voltage threshold state while non-selected devices are undisturbed. During the write cycle, the source and drain electrodes of each element are maintained at the same potential having either a first or a second value whereby there is no steady state current flowing through the devices and no steady state power dissipation on the memory array.

9 Claims, 11 Drawing Figures

INVENTORS
Edward C. Ross
BY H. Christofferson
ATTORNEY

INVENTORS
Edward C. Ross
BY H. Christoffersen
ATTORNEY

MEMORY SYSTEM USING VARIABLE THRESHOLD TRANSISTORS

BACKGROUND OF THE INVENTION

A memory array using one active element per bit location has been sought after for a number of years. The metal-nitride-oxide-silicon (MNOS) transistor promises to fill this need since it is an element which may assume two stable states and which may be fabricated by large scale integrated circuit techniques to provide large memory arrays which are small, have a high information density and are potentially inexpensive. However, there are many problems involved with the integration of memory arrays utilizing MNOS transistors due to the fact that in integrated form the transistors are not individually accessible at their four terminals (gate, drain, source and substrate) but rather have their terminals common with many other devices in the array.

Several different system structures have been proposed which utilize memory transistors but these have suffered from one or more of the following shortcomings:

a. Individual well diffusions are required for each transistor or per row of transistors in order to vary the substrate potential for selected transistors in the array;

b. The substrate of the entire array must be pulsed for operation;

c. Large steady state currents flow in some of the half selected devices during the writing cycle;

d. More than one transistor per bit of information is required.

A recent publication, "An Integrated Metal-Nitride-Oxide-Silicon (MNOS) Memory," by Dov Frohman-Bentchkowsky, at page 1190 of the IEEE proceedings of June, 1969, suggests one solution which, however, is not completely satisfactory. The memory of the article shown in FIG. 1 is a word-organized memory array using P-channel metal-nitride-oxide-semiconductor (P-MNOS) bistable elements (transistors Q11, Q13, Q31, Q33) whose threshold voltage ($V_T$) is set to a high threshold level ($V_{TH}$) by applying a large negative bias (−25 volts) between the gate and substrate and to a low threshold state ($V_{TL}$) by applying a large positive bias (+25 volts) between the gate and substrate of the elements.

The operation of the prior art circuit of FIG. 1 is best understood by reference to the waveforms shown in FIG. 2. In FIG. 1 an erase or clear cycle is generated as follows. A read/write pulse of negative amplitude is applied to the gate of transistors $Q_{A1}$, $Q_{A3}$ causing ground potential to be applied to the drain lines $B_{D1}$, $B_{D3}$. Concurrently, a ground potential may be applied to the source lines $B_{S1}$ and $B_{S3}$, as shown in FIG. 2, by means of appropriate voltage levels at $B_{G1}$ and $B_{G3}$ which turn transistors $Q_{51}$ and $Q_{53}$ on. With, for example, ground potential on the source lines ($B_{S1}$, $B_{S3}$) the drain lines ($B_{D1}$, $B_{D3}$) and the substrate, a large positive pulse applied to a word line (such as $W_1$) causes the elements (such as Q11, Q13) to be switched to their low voltage threshold ($V_{TL}$) state.

Following the erase cycle is a write cycle during which information is stored in the array by setting selected devices of a word to the high voltage threshold ($V_{TH}$) state. However, as described below, this is done at the cost of drawing a steady state current through the devices being set. During the write cycle the read/write pulse (see FIG. 2) is returned to zero volts which causes the drain lines ($B_{D1}$, $B_{D3}$) to go to a negative potential since they are returned to $-V_{DD}$ volts through the impedance paths of transistors $Q_{D1}$, $Q_{D3}$ which are connected as diodes. Now assume, for example, that transistor Q13 is to be switched to the $V_{TH}$ state and that the remaining transistors are to be undisturbed. To switch transistor Q13 to the $V_{TH}$ state, a negative pulse (−25 volts) is applied to the word line ($W_1$) and theoretically zero volts should be applied at the source and drain regions (see $B_{S3}$ and $B_{D3}$ lines in FIG. 2). However, an examination of the circuit of FIG. 1 reveals that for the condition of the read/write pulse at zero volts the $B_{D3}$ line is at a negative potential. A negative voltage (−10 volts) is applied to turn $Q_{53}$ on and this places the $B_{S3}$ line at ground. This causes current to flow from the common ground terminal through transistor $Q_{53}$, through memory element Q13 and through diode $Q_{D3}$ to the $-V_{DD}$ terminal. Thus, to establish a low value of potential along the channel of an element being set, the prior art circuit requires an impedance path between ground and a source of operating potential through which there is a steady state current flow. The existence of the conducting path creates many problems some of which are discussed below:

1. For the above example, to maintain the $B_{D3}$ line at or near ground potential, the impedance of the conduction path of transistor $Q_{D3}$ must be much greater than the series impedance of conduction paths of transistors Q13 and $Q_{53}$. It is therefore impossible to have a "hard" ground on the $B_{D3}$ line since its potential is a function of impedance ratios. Secondly, since the impedance of transistor $Q_{D3}$ must be greater than the series impedance of transistors Q13 and $Q_{53}$, it ($Q_{D3}$) must be physically smaller than the other devices. This imposes the requirements that the impedance and size of the elements be controlled which is a serious limitation. Furthermore, the driving circuitry imposes a lower limit on the size of the bistable element (Q13) which for consideration of packing density should be the smallest device possible. The prior art circuit thus imposes a basic restraint on the design of a large scale integrated memory array one of whose major criteria is the use of the smallest (physically) devices possible.

2. The selected devices conduct during the write cycle which means that there is current flowing through the channel and hence that there is a potential drop across the channel. As a result, the potential between the gate and every point along the channel is not the same and the traps, which determine the threshold voltage, will not be uniformly charged.

3. Every selected element will conduct a steady state current during the writing cycle. For a large memory array, these currents may result in considerable power dissipation and worst of all cause heat dissipation on the memory chip which is inimical to the design of a simple, high density large scale integrated memory circuit.

It is an object of this invention to provide an improved matrix array which requires only one element per storage location.

SUMMARY OF THE INVENTION

A matrix array of field-effect semiconductor devices sharing a common substrate, each device having a control electrode and first and second electrodes defining a conduction path and of the type having at least two threshold levels; said devices arranged in rows and columns with the devices of a row having their conduction paths connected between two bit lines and the devices of a column having their control electrode connected in common to a word line. Means for setting the elements of the array to either one of two threshold levels which includes separate switches connected to each bit line for applying through a low impedance one of two potentials to the bit lines. The two bit lines of a row are connected to the same potential during the setting cycle for maintaining them at the same potential and preventing any steady state current flow. The setting means also includes means for applying a first potential to one word line at a time which is in a direction to inhibit conduction of the devices and a second potential to one word line at a time which is in a direction to cause conduction of the devices.

BRIEF DESCRIPTION OF THE DRAWINGS

In the accompanying drawings, like reference characters denote like components.

FIG. 5 is a drawing of some of the waveforms associated with the circuit of FIG. 4*a.

DETAILED DESCRIPTION

The semiconductor devices contemplated for use in practicing the invention have a variable threshold voltage which may be set to one of two of a multiplicity of values by applying a potential of greater than given amplitude between the gate and substrate of the device and which maintain the threshold voltage ($V_T$) to which they are set for a considerable period of time. Included in this class of devices are bistable field-effect transistors having a metal-insulator-semiconductor (MIS) structure in which charge can be stored.

A specific, but not limiting, example of the above type of transistor is one whose insulating layer is a double layer of silicon nitride and silicon dioxide and which is commonly referred to as an MNOS (metal-nitride-oxide-silicon) device. This transistor may be fabricated using standard metal-oxide-semiconductor (MOS) techniques, except that just prior to metalization, the gate oxide is made very thin and a nitride layer is deposited between the silicon dioxide and the gate of the device. The resulting transistor may be of either the P-type or the N-type and has first and second electrodes defining the ends of a conduction path and a gate electrode which is used to control the level of conduction in the conduction path. The transistor has the same general characteristics as a standard MOS device except that the addition of the insulating nitride layer over the thin oxide region allows charge to be stored at or near the interface between the two insulators and results in the characteristics shown in FIG. 3.

Figure 1:
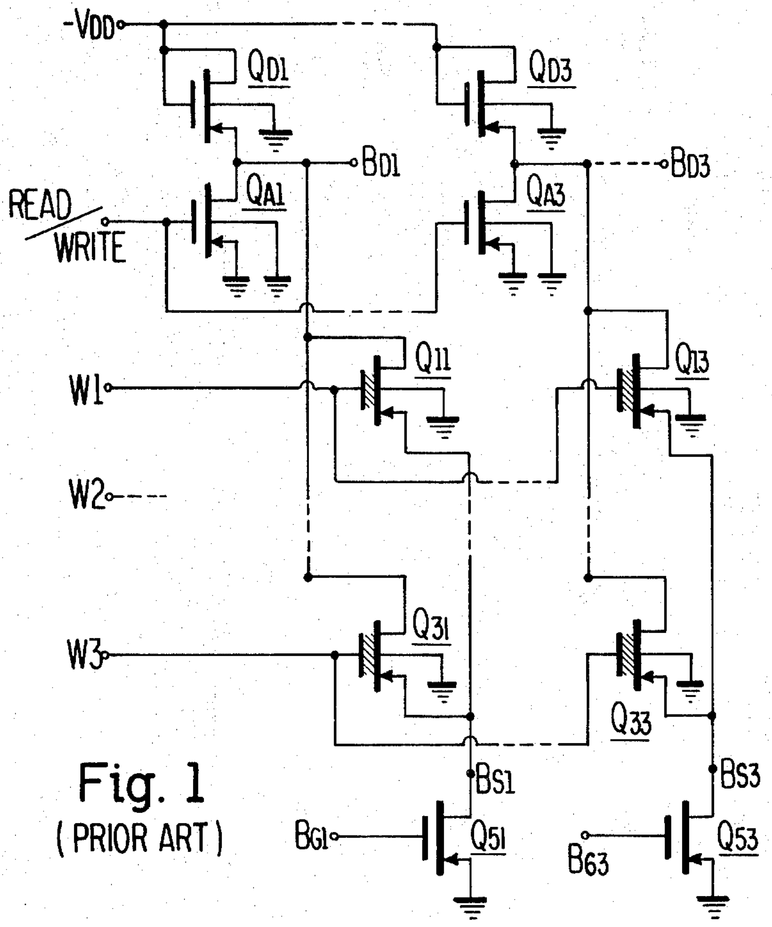
Fig. 1 (PRIOR ART)
FIG. 1 is a schematic drawing of a matrix array and its driving circuitry according to the prior art.
Figure 2:
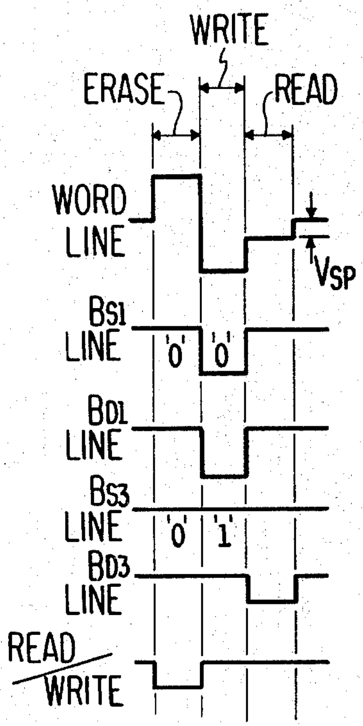
Fig. 2. (PRIOR ART)
FIG. 2 is a drawing of some of the waveforms associated with the prior art circuit of FIG. 1.
Figures 3, 6A, 6B, 6C, 6D, 6E:
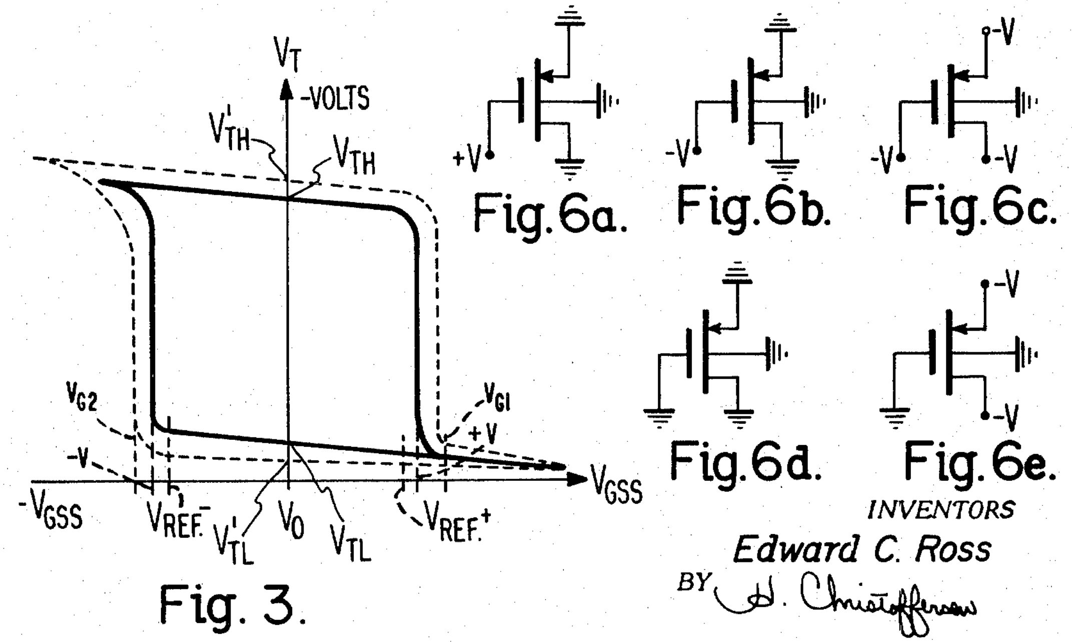
FIG. 3 is a plot of threshold voltage ($V_T$) as a function of the applied gate to substrate potential illustrating the bistable characteristics of the devices used to practice the invention.
* and FIGS. 6*a*, 6*b*, 6*c*, 6*d* and 6*e* are schematic drawings of a typical element of the array under various bias conditions.

FIG. 3 is an idealized representation of the hysteresis characteristic of the threshold voltage ($V_T$) of a P-type conductivity device as a function of applied gate-to-substrate voltage ($V_{GSS}$) of a typical device such as discussed above. The threshold voltage ($V_T$) is defined as the gate potential at which current may start to flow in the conduction path of the transistor. The point marked $V_{TL}$ refers to the low value of $V_T$ and the point marked $V_{TH}$ refers to the high value of $V_T$. $V_{TL}$ may, for example, be minus two volts and $V_{TH}$ may be minus 6 volts. The reference voltages $V^+_{REF}$ and $V^-_{REF}$ indicate the gate-to-source potentials at which the transistor changes state. The value of $V^+_{REF}$ and $V^-_{REF}$ depends upon the particular device employed, however, for purposes of the present discussion they are assumed to be between −15 volts and +15 volts.

Any value of $V_{GSS}$ (for a given pulse duration) smaller than $V^+_{REF}$ or $V^-_{REF}$ does not affect the threshold setting of the semiconductor device depicted in FIG. 3. However, if $V_T$ initially is $V_{TL}$ and $V_{GSS}$ is made −V where −V is greater and more negative than $V^-_{REF}$, the threshold voltage follows the hysteresis curve upward as shown in FIG. 3, and takes on the value of $V_{TH}$. When, and if, $V_{GSS}$ is subsequently reduced to zero volts, $V_T$ remains set at $V_{TH}$. If the threshold voltage initially is $V_{Th}$ and $V_{GSS}$ is made +V where +V is greater and more positive than $V^+_{REF}$, the threshold voltage follows the hysteresis curve downward and $V_T$ takes on the value of $V_{TL}$. When, and if, $V_{GSS}$ is subsequently reduced to zero volts, $V_T$ remains set at $V_{TL}$.

It should be noted that the MNOS transistors under discussion are analog devices which are capable of being set to a number of threshold states. That is, for example, by applying a $V_{GSS}$ of $V_{G1}$ greater than +V, the P-type transistor may be set to a $V_{TL}'$ state as shown in FIG. 3. Alternatively, by applying a $V_{GSS}$ of $V_{G2}$ which is more negative than −V, the P-type transistor may be set to a $V_{TH}'$ state as shown in FIG. 3. However, in practice, for most logic applications, the voltages applied between the gate, the substrate and the electrodes of the devices are limited to specific levels (±V) such that the devices are caused to assume only one of two of the many available threshold conditions. Note that for the N-type transistors a $V_{GSS}$ more negative than $V^-_{REF}$ (in a direction to inhibit conduction) sets the device to a low threshold voltage state and a $V_{GSS}$ more positive than $V^+_{REF}$ (in a direction to enhance conduction) sets the device to a high threshold voltage state.

Figure 4A:
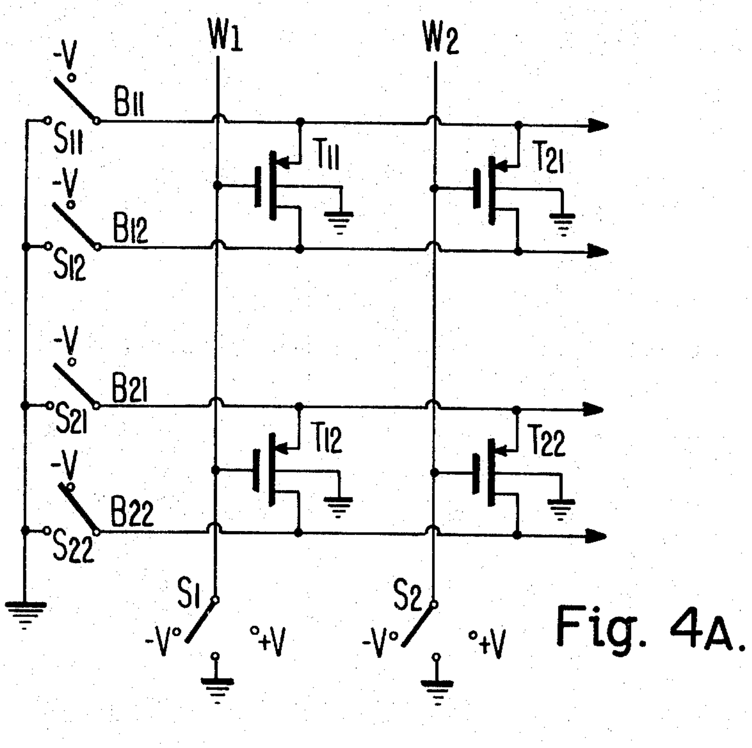
FIG. 4*a* is a schematic drawing of a matrix array and the circuitry for driving the array embodying the invention.

Arrays embodying the invention may have M words of *j* bits each where *M* and *j* are integers greater than one and *M* and *j* may or may not be equal. For ease of illustration in the circuit of FIG. 4*a*, $M=j=2$. Each bit location includes a single bistable transistor denoted by $T_{Mj}$ where $M$ defines the word position and $j$ defines the bit position. The transistors making up a column (word) have their gate electrodes connected in common to a word line. The transistors making up a row (all having the same bit significance) have their source electrodes connected to a first bit line denoted $B_{j1}$ and their drain electrodes connected to a second bit line denoted $B_{j2}$ where $j$ as before refers to the bit significance of the row.

Each bit line is connected to a single pole double throw switch $S_{j1}$, $S_{j2}$ in order to apply either a ground potential or a $-V$ potential to the bit line. During the clear and write cycle as further described below $S_{j1}$ and $S_{j2}$ are operated in tandem both being returned to the same value of potential. This ensures that there is substantially no potential difference between the two bit lines of a row and thus substantially no current flow therebetween. Note that though the switches are operated in tandem during the write cycle they are independently controlled and the potential on the bit lines is independent of the impedance or ratio of impedances of the switches.

Figure 4B:
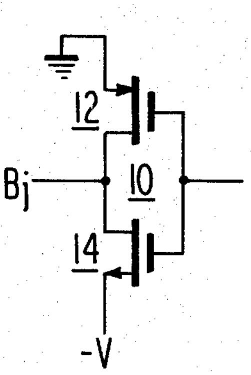
FIG. 4*b* is a drawing of a transistorized switch which may be used to practice the invention.

The single pole double throw switches may be, as shown in inset FIG. 4*b*, a complementary inverter, whose two transistors (12, 14) have their drains connected in common to the bit line, their gate electrodes connected in common to a control signal source, and with the source of the P-type transistor 12 connected to ground potential and the source of the N-type transistor 14 connected to $-V$ potential.

Figure 5:
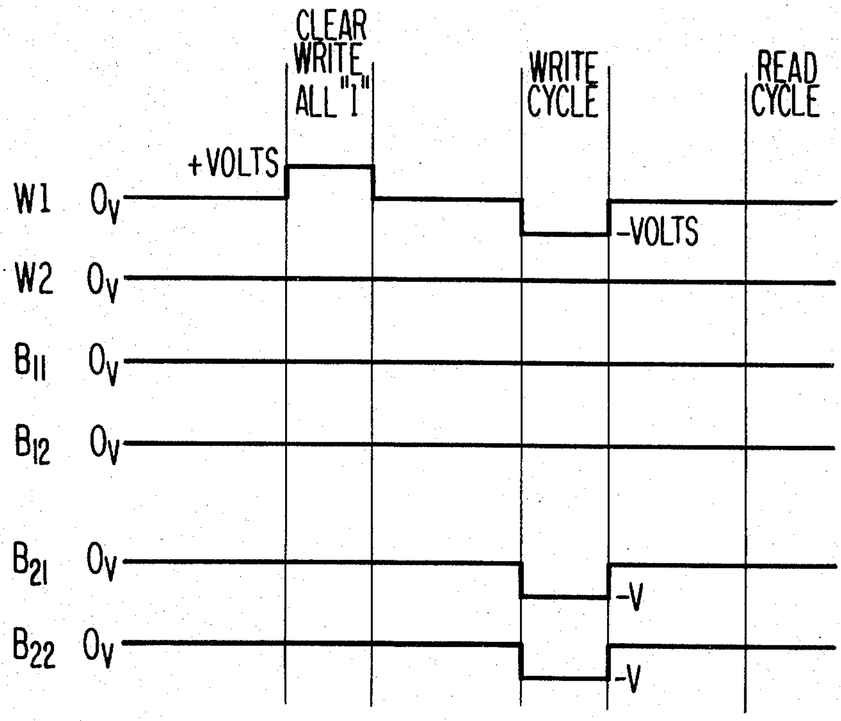

The operation of each column being identical to that of any other column, only column 1, arbitrarily selected, is described in detail with the aid of the waveform diagrams of FIG. 5. First, a clear pulse of amplitude $+V$ volts as shown on line $W_1$ of FIG. 5 is applied to the word 1 ($W_1$) line and all the bit lines ($B_{j1}$, $B_{j2}$) are returned to ground potential by throwing the bit line switches to the ground potential terminal. Since the elements are of the P-type, a positive pulse of greater than a given reference value applied to the gate with respect to the substrate as shown in FIG. 6a causes all the elements of the column to be switched to their low voltage threshold ($V_{TL}$) state. With $+V$ volts applied to the $W_1$ line but with ground potential applied to the remaining word and bit lines the transistors in the remaining columns of the array are undisturbed since all their electrodes are kept at the same potential as shown in FIG. 6d.

Assume now that it is desired to set element $T_{11}$ so that its threshold voltage is switched to the high state ($V_{TH}$). Transistor $T_{11}$ must be switched while transistor $T_{12}$ is maintained in the $V_{TL}$ state and the remaining elements of the array are undisturbed. Element $T_{11}$ is set to $V_{TH}$ by applying zero volts to the substrate and to bit lines $B_{11}$ and $B_{12}$ and by applying $-V$ volts to word line 1 ($W_1$). The negative level or pulse of $-V$ amplitude applies a bias to the gate with respect to the substrate which is greater than the given reference value ($V^-_{REF}$) and ensures the resetting of the transistor to its high threshold voltage state.

The resetting bias condition of element $T_{11}$ is illustrated in FIG. 6*b* where $-V$ volts is applied to the gate of the transistor while its source, drain and substrate are returned to ground potential. For this bias condition, an electric field exists between the gate and the substrate which is uniform across the length of the conduction channel existing between the drain and source regions of the transistor. Note again that since the source and drain have the same applied potential that there is no steady state current.

Having set elements $T_{11}$ to $V_{TH}$ it remains to be seen that the remaining elements of the array are undisturbed. Particularly, it will be seen that neither those non-selected elements sharing the same column nor those sharing the same row as the selected transistor ($T_{11}$) are disturbed.

Element $T_{12}$ which shares the same word line as transistor $T_{11}$ has its gate connected to $W_1$ and therefore has $-V$ volts applied to it. To prevent transistor $T_{12}$ from switching state $-V$ volts is applied by means of switches $S_{21}$, $S_{22}$ to the source and drain of the transistor. The bias condition of the transistor is illustrated in FIG. 6c. At first glance, it would seem that transistor $T_{12}$ should also switch to the $V_{TH}$ state since it has $-V$ volts applied between the gate ($-V$ volts) and the substrate (ground potential). However, a detailed analysis reveals that the $-V$ potential applied to the gate induces a conduction channel between the source and drain. Since the source and drain are both at $-V$ volts, the potential of the conduction channel will be $-V$ volts. There is therefore no large potential differential across the insulating layers and the transistor remains in its previously set state $V_{TL}$. Therefore $T_{12}$ as well as any other memory location in the same column (sharing the same word line) as $T_{11}$ will be undisturbed. Note again that the source and drain are maintained at the same potential and there is thus no current flow through the device.

Element $T_{21}$ which shares the same row as transistor $T_{11}$ has its gate, substrate, source and drain grounded. This bias condition, illustrated in FIG. 6*d*, maintains the transistor undisturbed.

Element $T_{22}$ which shares the same row as element $T_{12}$ has its gate and substrate connected to ground potential and its source and drain electrodes connected to $-V$ volts as shown in FIG. 6*e*. Under this bias condition the gate to substrate potential ($V_{GSS}$) is nearly zero volts and a potential differential of $-V$ volts amplitude exists across the source-to-substrate and drain-to-substrate junctions. The potential differential sets up an electric field whose effect is limited for practical purposes to the junction between the P-regions comprising the source and drain and the substrate. The potential of the conduction channel between the source and drain regions remains near ground potential and the transistor remains undisturbed.

It has thus been shown that information may be written into and stored in selected elements without disturbing the state of any of the non-selected elements. It has further been shown that by operating the two switches connected to the two bit lines of each row in a ganged fashion (i.e., always connecting them to the same potential points) that the elements may be set without the flow of any steady state currents. There is thus practically no steady state power dissipation required in the erase and write cycle of the memory. By using a single pole, double throw switch or its equivalent per bit line and by ganging the switches during the erase and write cycle a considerable improvement over the circuit of the prior art is obtained. Note that in the prior art, one bit line is connected to the equivalent of a single pole single throw switch and the other bit line is connected to a junction point. Connected to the junction point is a circuit whose equivalent is a single pole, single throw switch used to clamp the junction point to ground potential and an impedance which returns the junction to a source of operating potential.

The information stored in the array of the present application may be read out non-destructively a word at a time by applying a read voltage ($V_R$) which is greater than $V_{TL}$ but less than $V_{TH}$ to the selected word line ( $V_{TL} < V_R < V_{TH}$ ) and by applying zero volts to the $B_{j1}$ lines and typically −5 volts to the $B_{j2}$ lines. For the example discussed above, with $T_{11}$ set to $V_{TH}$ and $T_{12}$ set to $V_{TL}$ and with $V_R$ applied to word line $W_1$, $T_{12}$ will conduct while transistor $T_{11}$ remains non-conducting.

What is claimed is:

1. The combination of:

an array of field-effect devices, arranged in columns and rows and sharing a common substrate, each device having a control electrode and first and second electrodes defining a conduction path, and each device of the type capable of assuming two threshold levels, the devices of each row having their conduction paths connected between a different pair of bit lines and the devices of each column having their control electrodes connected to a different word line; a plurality of single pole double throw switch means, one per bit line, each switch means directly connecting its bit line to either one of first and second potentials;

means for setting, the threshold level of a device to one of said two threshold levels including means for operating the switch means to apply to each bit line said first potential and for concurrently applying to selected word lines a first voltage of greater than a given reference value with respect to said first potential in a direction to inhibit conduction of the devices; and means for setting, a column at a time, selected ones of said devices to the other one of said two threshold levels including means for connecting the switch means associated with the two bit lines of the selected transistors to said first potential and the switch means associated with the two bit lines of the non-selected transistors to said second potential and for concurrently applying to the word line of the selected transistors a second voltage of greater than a given reference value with respect to said first potential in a direction to cause conduction of the selected transistors, the magnitude of said second voltage and said second potential being approximately equal.

2. The combination as claimed in claim 1 wherein said common substrate is maintained at said first potential.

3. The combination as claimed in claim 1 wherein said first potential is ground potential; wherein one of said first and second voltages is more positive than said ground potential and the other of said first and second voltages is more negative than said ground potential; and wherein said ground potential is applied to said common substrate.

4. The combination as claimed in claim 1 wherein each one of said switch means includes a first transistor for clamping said bit line to one of said two potentials and a second transistor for clamping said bit line to the other one of said two potentials.

5. The combination as claimed in claim 4 wherein said devices capable of assuming two threshold levels are field-effect transistors having a second insulator layer in addition to the oxide layer between the gate and the substrate.

6. In combination:

a matrix array of bistable insulated gate field-effect transistors directly connected to a common substrate arranged in rows and columns, and having two bit lines per row and one word line per column, each transistor having a control electrode and first and second electrodes defining the ends of a conduction path; the conduction path of the transistors of each row being coupled between the first and second bit lines associated with that row and the transistors of a column having their control electrode connected in common to the word line associated with that column, each transistor being of the type which in response to a first voltage of greater than a given reference value applied between its control electrode and its substrate in a direction to cause conduction exhibits a first threshold level and which in response to a second voltage of greater than a given reference value applied between its control electrode and its substrate in a direction to inhibit conduction exhibits a second threshold level;

a single pole double throw switch per bit line, each switch having a common electrode connected to said bit line, having a normally closed contact connected to a reference potential and a normally open contact connected to a first potential;

means for setting the transistors of said matrix to said second threshold level including means for applying said reference potential to said substrate and through said switches to the bit lines and including means for applying a potential, substantially equal in magnitude and direction to said second voltage, to the word lines; and means for then setting selected ones of said transistors, one column at a time, to said first threshold level including means for applying said first potential substantially equal in magnitude and direction to said first voltage to their associated word line and means for maintaining the switches associated with the two bit lines of the selected transistors in their normally closed condition and for switching the switches associated with the bit lines of the non-selected transistors to the normally open condition.

7. In combination:

an array of metal-nitride-oxide semiconductors (MNOS) memory devices arranged in columns and rows, each device having a conduction path and a gate electrode;

a plurality of column conductors, each column conductor connected to the gate electrodes of all devices in that column;

a plurality of pairs of row conductors, each pair connected across the conduction paths of all devices in its row;

means for placing the devices in a selected column in one state comprising means for placing all of the row conductors at ground and means for placing the conductor for that column at a voltage level to inhibit conduction through the devices in that column; and means for changing the state of a device in the selected column and in a selected row to a second state comprising means for applying to that column conductor a voltage in a sense to enhance conduction through all devices in that column, means for placing the pair of conductors in the selected row at ground, and means for applying to the remaining pairs of row conductors a voltage of the same polarity and approximately the same value as applied to the selected column conductor.

8. In combination:

an array of field effect memory devices capable of assuming two states arranged in columns and rows, each device having a conduction path and a gate electrode;

a plurality of column conductors, each column conductor connected to the gate electrodes of all devices in that column;

a plurality of pairs of row conductors, each pair connected across the conduction paths of all devices in its row;

means for placing devices in a selected column in one state comprising means for placing the row conductors for said devices at the same potential and means for placing the conductor for that column at a voltage level greater than a given first value and in a sense to inhibit conduction through said devices in that column; and means for changing the state of at least one device in the selected column and in a selected row to its second state comprising means for applying to the selected column conductor a voltage greater than a predetermined second value in a sense to enhance conduction through all devices in that column, means for placing the pair of conductors in the selected row at a reference level, and means for applying to the row conductors for nonselected devices a voltage of the same polarity and approximately the same value as applied to the column conductors.

9. In the combination as set forth in claim 8, said means for applying to the remaining pairs of row conductors a voltage of the same polarity and approximately the same value as applied to the selected column conductors including:

a pair of low impedance switches for each remaining pair of row conductors one switch of a pair connected between one row conductor and a source of said voltage and the other switch of a pair connected between the other row conductor and said source of said voltage; and means for concurrently closing both switches.

* * * * *

UNITED STATES PATENT OFFICE
CERTIFICATE OF CORRECTION

Patent No. 3,720,925 Dated March 13, 1973

Inventor(s) Edward C. Ross

It is certified that error appears in the above-identified patent and that said Letters Patent are hereby corrected as shown below:

Col. 7 - line 47 - change "transistors" to --devices--
" " - line 49 - change "transistors" to --devices--
" " - line 51 - change "transistors" to --devices--
" " - line 55 - change "transistors" to --devices--

Signed and sealed this 25th day of December 1973.

(SEAL)
Attest:

EDWARD M.FLETCHER,JR.
Attesting Officer

RENE D. TEGTMEYER
Acting Commissioner of Patents

USCOMM-DC 60376-P69
☆ U.S. GOVERNMENT PRINTING OFFICE : 1969 O—366-334